United States Patent
Tsuda et al.

(10) Patent No.: US 6,392,845 B1
(45) Date of Patent: May 21, 2002

(54) MAGNET DESIGN FOR ACTIVE DAMPING OF DISK DRIVE ACTUATOR

(75) Inventors: Shingo Tsuda, Yokohama; Eiji Soga, Yamoto; Kiyoshi Satoh, Fujisawa, all of (JP); Fu-Ying Huang, San Jose, CA (US); Tetsuo Senba, Zama (JP)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 09/608,516

(22) Filed: Jun. 30, 2000

(30) Foreign Application Priority Data

Aug. 11, 1999 (JP) ............................................ 11-227493

(51) Int. Cl.[7] .................................................. G11B 5/48
(52) U.S. Cl. ..................................................... 360/264.9
(58) Field of Search ............................... 360/264.7–265

(56) References Cited

U.S. PATENT DOCUMENTS 5,523,911 A * 6/1996 Mita ........................ 360/264.7

* cited by examiner

Primary Examiner—A. J. Heinz
(74) Attorney, Agent, or Firm—Robert B. Martin; Bracewell & Patterson, L.L.P.

(57) ABSTRACT

A stator magnet according to a first embodiment of the present invention forms a voice coil motor with a closed coil. The closed coil is supported by an actuator arm in a rotatable manner and at a predetermined rotation angle. The closed coil has first and second side edges that extend along different lines in radial directions whose center is a center of rotation of the actuator arm. It also has an outer edge that connects edges of outer sides of the first and second side edges with viewed from the radial direction, and extends along an arc whose center is the center of rotation. A first magnetic pole region is located within a moving area of the first side edge to act on the first side edge. A second magnetic pole region is located within a moving area of the second side edge to act on the second side edge. The polarity of the second magnetic pole region is opposite to the polarity of the first magnetic pole region. A third magnetic pole region is located within a moving area of the outer edge to act on the outer edge. The polarity of the third magnetic pole region is the same as the polarity of the first magnetic pole region.

7 Claims, 10 Drawing Sheets

MAGNET DESIGN FOR ACTIVE DAMPING OF DISK DRIVE ACTUATOR

BACKGROUND OF THE INVENTION

1. Technical Field

The present invention relates to a disk drive, an actuator, and a stator magnet configuring a voice coil motor (hereinafter, a VCM) of the actuator, and in particular, to a configuration for improving a breathing phenomenon of a coil occurring during the operation of the VCM.

2. Description of the Related Art

FIG. 10 is a schematic of an actuator 100 used in a conventional hard disk drive. An actuator arm 101 is configured by a suspension 102 and a coil support part 103 in one piece, is rotatably supported by a rotary shaft 104 setting on a base (not shown), and is driven by a VCM, described later, in the direction shown by an arrow J or K.

A slider 109 is supported in an edge of the suspension 102, and respective heads for reading and writing that are not shown are provided on this slider 109. When the actuator arm 101 is positioned on a recording surface of a hard disk (not shown) rotating, the actuator 100 is configured so that the heads face the recording surface with keeping a predetermined gap between the recording surface and themselves by the slider 109 flying over the recording surface of the disk.

In the actuator arm 101, the slider 109 is supported in the edge of the suspension 102 as described above. Nevertheless, a pair of coil supports 103a and 103b for sandwiching a flat coil 105 configuring the VCM is formed in the coil support part 103 positioned in the opposite side of the slider 109 against the rotation shaft 104. A lower stator magnet retention plate 106 fixed on the base retains a stator magnet 107 below the flat coil 105. The stator magnet 107 has a north pole 107a and a south pole 107b, and these are formed with making a boundary 107c a borderline. The VCM is configured by these flat coil 105 and stator magnet 107, and the actuator 100 is configured by this VCM and the actuator arm 101.

In the configuration described above, the flat coil 105 obtains a force in a rotational direction shown by an arrow H in each of the side edges 105a and 105b. This is because the flat coil 105 is located so that an electromagnetic action may occur between the flat coil 105 and stator magnet 107. Therefore, the actuator arm 101 obtains a rotary force in a clockwise direction if current in the direction shown by an arrow m passes through the flat coil 105. On the contrary, if the current passes through the flat coil 105 in the direction shown by an arrow n, the actuator arm 101 obtains a rotary force in the counterclockwise direction. This is because the flat coil 105 obtains a force in the rotary direction shown by an arrow I in each of the side edges 105a and 105b.

On the other hand, an outer edge 105c of the flat coil 105 is not supported by the coil support part 103 because of lightening and miniaturizing the coil support part 103, and further making a torque small. Nevertheless, the outer edge 105c receives a force in a radial direction shown by an arrow F or G according to the direction of the current passing and its rotary position.

FIGS. 11 and 12 are operational diagrams for explaining a force that the outer edge 105c of the flat coil 105 receives, but the suspension 102 of the actuator arm 101 (FIG. 10) is omitted. FIG. 11 shows such a state that the actuator arm 101 is present at a position (hereinafter, this is called an OD position) where the actuator arm 101 rotates at most in the direction, shown by an arrow H, within its rotatable range. At this position, the outer edge 105c of the flat coil 105 is present above the north pole 107a of the stator magnet 107. Therefore, if current in the direction shown by an arrow m passes through the flat coil 105, the outer edge 105c receives a force in the direction shown by an arrow F that heads from the shaft center of the rotary shaft 104 to the outside. On the contrary, if current in the direction shown by an arrow n, the outer edge 105c receives a force in the direction shown by an arrow G that heads toward the shaft center of the rotary shaft 104.

FIG. 12 shows such a state that the actuator arm 101 is present at a position (hereinafter, this is called an ID position) where the actuator arm 101 rotates at most in the direction, shown by an arrow I, within its rotatable range. At this position, the outer edge 105c of the flat coil 105 is present above the south pole 107b of the stator magnet 107. Therefore, if current in the direction shown by an arrow m passes through the flat coil 105, the outer edge 105c receives a force in the direction shown by an arrow G. On the contrary, if current in the direction shown by an arrow n, the outer edge 105c receives a force in the direction shown by an arrow F.

FIGS. 13 and 14 are drawings of analyzing the deformation of the flat coil 105 and coil supports 103a and 103b, sandwiching the flat coil 105, when the flat coil 105 resonates at a predetermined frequency by alternately receiving forces in the directions shown by No arrows F and G, by numerical simulation using a finite-element method (FEM). As shown in FIG. 13, when the outer edge 105c of the flat coil 105 protrudes in the direction shown by an arrow F and hence the flat coil 105 is extended, an angle between the coil supports 103a and 103b sandwiching this decreases. On the other hand, as shown in FIG. 14, when the outer edge 105c of the flat coil 105 dents in the direction shown by an arrow G and hence the flat coil 105 is shrunk, an angle between the coil supports 103a and 103b sandwiching this increases.

Such a vibration mode wherein a coil is extended and shrunk is called a coil-breathing mode. A piezoelectric element 108 (FIG. 10) detects an amount of extension or shrinkage of the coil support 103b where the piezoelectric element 108 is fixed. In addition, as FIG. 13, the piezoelectric element 108 detects extension when the flat coil 105 is extended and hence the angle between the coil supports 103a and 103b decreases. Furthermore, the piezoelectric element 108 outputs, for example, plus voltage at a level according to the extension amount. On the contrary, as shown in FIG. 14, the piezoelectric element 108 detects shrinkage when the flat coil 105 is shrunk and hence the angle between the coil supports 103a and 103b increases. Furthermore, the piezoelectric element 108 outputs, for example, minus voltage at a level according to the shrinkage amount. In addition, a fixed position of the piezoelectric element 108 (FIG. 10) is determined so that it is possible to detect warpage occurring when the actuator arm 101 receives acceleration in a rotary direction.

FIGS. 15a and 15b show frequency characteristics of a transfer function from the drive current of the flat coil 105 to the output voltage of the piezoelectric element 108 in the actuator 100 (FIG. 10) configured as described above. In the frequency characteristic charts, the horizontal axis shows frequencies from 2 kHz to 16 kHz that are linearly graduated. In addition, the vertical axis in FIG. 15(a) shows gains expressed in decibels, and the vertical axis in FIG. 15(b) shows phases. Furthermore, dotted lines show frequency characteristics of a transfer function A2od(s) at the time when the actuator arm 101 is near the OD position shown in FIG. 11. Moreover, continuous lines show frequency characteristics of a transfer function A2id(s) at the time when the actuator arm 101 is near the ID position shown in FIG. 12.

As being apparent from FIG. 15, although the actuator 100 resonates at nearly 4 kHz, this is butterfly resonance caused by the warpage of the actuator arm 101. In addition, although the phase largely changes near this frequency, two phases at different rotary positions of the actuator arm, that is, the OD position and ID position become the same.

On the other hand, resonance at nearly 10 kHz is coil-breathing resonance caused by the coil breathing described above. In this resonance, the phases at different rotary positions, that is, the OD position and ID position become opposite. This is because directions of the forces that the outer edge 105c receives become opposite against the current passing through the outer edge 105c since polarities of the stator magnets that the outer edge 105c of the flat coil 105 faces at the OD position and ID position are different.

Technology of actively damping the above-described butterfly resonance is disclosed in Japanese Patent Application No. 11-80723 filed by the present applicant. According to this, in a hard disk drive, by not only performing tracking control to drive a VCM of an actuator so as to make heads positioned above a desired track, but also driving the VCM of the actuator in the direction where warpage is removed through detecting a warpage component of the actuator with the above-described piezoelectric element, the stability of the tracking control is improved.

Owing to this, a control signal for the tracking control and a control signal for damping the butterfly resonance are superimposed, and the current passing through a flat coil configuring the VCM on the basis of this signal superimposed is controlled. Nevertheless, if such damping control technology is applied to an actuator having frequency characteristics shown in FIGS. 15a and 15b, various problems arise. Thus, in a frequency band of 10 kHz or higher, coil breathing has large effect, and hence phases near rotary positions of the actuator arm 101, that is, the OD position and ID position are largely different. In particular, in nearly 10 kHz, and 14 kHz and higher, respective phases become opposite, and hence it is impossible to make stable control near both rotary positions compatible.

In addition, there is a method for removing a high frequency range, where the coil breathing has effect, by a filter in a control loop. Nevertheless, in the actuator 100 (FIG. 10) that has a wide rotation angle and is used in a hard disk drive, it is not possible to narrow the width of the outer edge 105c of the flat coil 105. Therefore, the resonance frequency of the coil breathing becomes low, and hence is present near a butterfly resonance frequency. Therefore, it is difficult to remove only this part by a filter.

Furthermore, so as to enlarge the torque of an actuator, it is common to extend magnetic poles of a stator magnet to a moving area of the outer edge 105c of the flat coil 105 as shown in FIG. 10. Nevertheless, even if the magnetic poles are configured, for example, for damping the coil-breathing phenomenon so that the magnetic poles may be not extended to this moving area, the flat coil 105 is affected by leakage magnetic flux from adjacent north and south magnetic poles. Therefore, it is difficult to damp the coil-breathing phenomenon at a level where the phenomenon has no effect on the control.

Thus, it is an object of the present invention to provide an actuator that can provide stabilized control of an actuator arm regardless of a rotary position of the actuator arm if the butterfly resonance and further coil breathing resonance are actively damped.

SUMMARY OF THE INVENTION

A stator magnet according to a first embodiment of the present invention forms a voice coil motor with a closed coil. The closed coil is supported by an actuator arm in a rotatable manner and at a predetermined rotation angle. The closed coil has first and second side edges that extend along different lines in radial directions whose center is a center of rotation of the actuator arm. It also has an outer edge that connects edges of outer sides of the first and second side edges with viewed from the radial direction, and extends along an arc whose center is the center of rotation. A first magnetic pole region is located within a moving area of the first side edge to act on the first side edge. A second magnetic pole region is located within a moving area of the second side edge to act on the second side edge. The polarity of the second magnetic pole region is opposite to the polarity of the first magnetic pole region. A third magnetic pole region is located within a moving area of the outer edge to act on the outer edge. The polarity of the third magnetic pole region is the same as the polarity of the first magnetic pole region.

DETAILED DESCRIPTION OF THE PREFERRED EMBODIMENT

Figure 1:
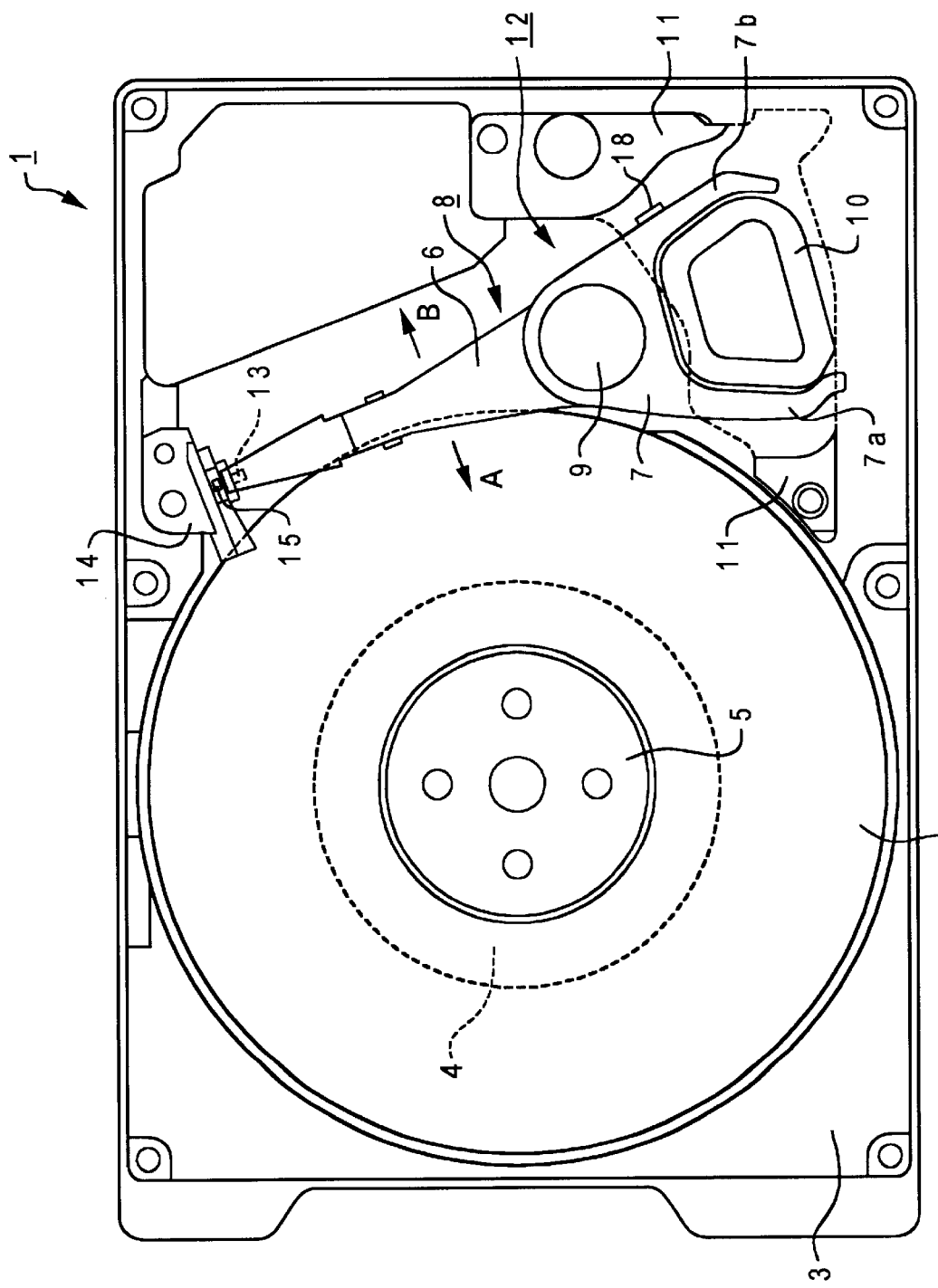
FIG. 1 is a top view of a hard disk drive showing an embodiment of the present invention.

FIG. 1 is a top view of a hard disk drive 1 showing an embodiment of the present invention. A disk 2 is supported in one piece by a hub 5 of a spindle motor 4 located on a base 3, and is rotationally driven by the spindle motor 4. An actuator arm 8 is configured by a suspension 6 and a coil support part 7 that are formed in one piece, and is rotatably supported by a rotary shaft 9 set on the base 3.

Coil supports 7a and 7b supporting a flat coil 10 in the side opposite to the suspension 6 against the rotary shaft 9 are formed respectively in this coil support part 7. The flat coil 10 configures a VCM with a stator magnet (not shown) fixed on the upper stator magnet retention plate 11 fixed on the base 3 above the flat coil 10, and a stator magnet 16 (FIG. 2) fixed on a lower stator magnet retention plate 17 described later.

Figure 2:
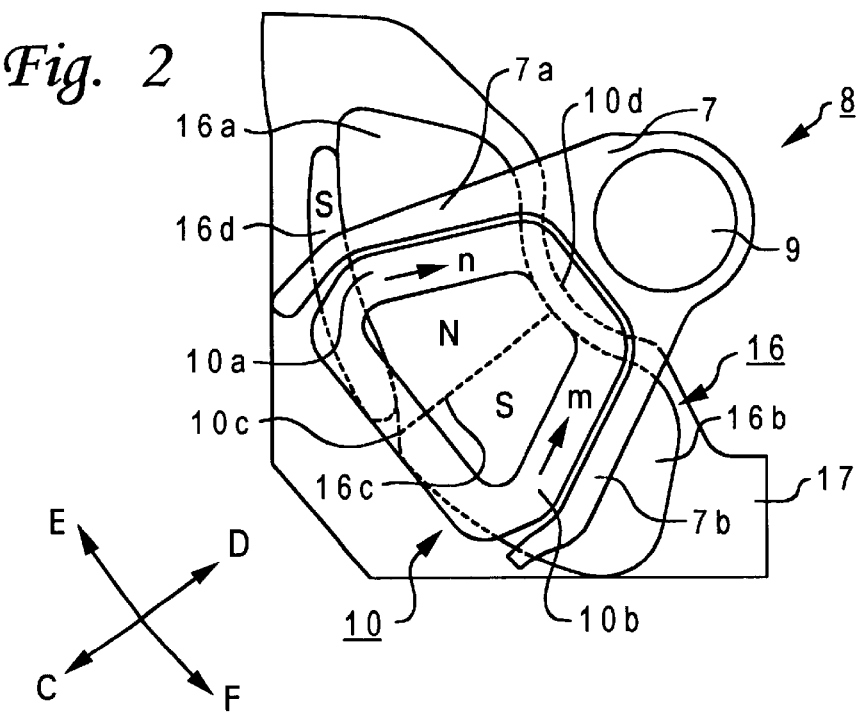
FIG. 2 is a schematic of a VCM of an actuator showing an embodiment of the present invention.

The VCM rotates the actuator arm 8 in the direction shown by an arrow A or B, and this VCM and the actuator arm 8 construct an actuator 12. In addition, in FIG. 1, the upper stator magnet retention plate 11 is shown with an upper main part being cut for convenience, and its contour is shown by a dotted line. Furthermore, as shown in FIG. 2, the lower stator magnet retention plate 17 for supporting a stator magnet 16 is provided on the base 3 also below the flat coil 10.

A slider 13 is supported in an end portion of the suspension 6, and respective heads for reading and writing of signals that are not shown are provided in predetermined positions of this slider 13. When the actuator arm 8 rotates in the direction shown by an arrow A and moves above a recording surface of the disk 2 rotating, the slider 13 flies above the recording surface of the disk 2, and the heads face the recording surface with keeping a predetermined gap between the heads and recording surface. A tab 15 in the end portion of the suspension 6 is placed on a ramp 14 located on the base 3 when the actuator arm 8 is unloaded and is at a home position.

A piezoelectric element 18 detects the extension or shrinkage of a fixed portion of the coil support 7b, where this piezoelectric element 18 is fixed, as described later, and transforms the extension or shrinkage into an electric signal to output the electric signal.

Although, in the above-described explanation, it is supposed that the disk 2 is a single one-sided disk for simple description, another suspension supporting heads scanning each recording surface is provided for double-sided recording. Furthermore, the suspension is fixed in the coil support part 7 at a position where the suspension overlaps the suspension 6, shown in FIG. 1, in a predetermined gap. Moreover, in case of recording a plurality of double-sided hard disks, the plurality of hard disks are supported in one piece by the hub 5 in a predetermined gap in a direction of a rotary shaft of the spindle motor 4. In addition, the number of suspensions each supporting heads scanning each recording surface corresponds to the number of recording surfaces. The suspensions are fixed in the coil support part 7 at positions where the suspensions overlap the suspension 6, shown in FIG. 1, in predetermined gaps. Nevertheless, since these treatments themselves are well known, detailed description will be omitted.

FIG. 2 is a schematic of the VCM of the actuator 12 (FIG. 1) showing an embodiment of the present invention. For simple description, the suspension 6 (FIG. 1) of the actuator arm 8 is omitted. In addition, only the stator magnet 16 supported by the lower stator magnet retention plate 17 provided on the base 3 (FIG. 1) is shown. Nevertheless, actually as described above, the stator magnet having the same polarity is also located on the upper stator magnet retention plate 11 (FIG. 1) at a position facing the stator magnet 16 through the flat coil 10.

The flat coil 10 has a substantially trapezoidal shape as shown in FIG. 2, and is wound in a substantially flat shape so that a closed loop may be formed. Furthermore, the flat coil 10 comprises: side edges 10a and 10b that extend along different lines in radial directions whose center is a center of rotation of the actuator arm 8; an outer edge 10c that connects edges of outer sides of both side edges with viewing in the radial directions and extends substantially along an arc whose center is the center of rotation of the actuator arm 8; and an inner edge 10d that connects edges of inner sides of both side edges with viewing in the radial directions and extends substantially along an arc whose center is the center of rotation of the actuator arm 8.

The lower stator magnet retention plate 17 supports the stator magnet 16 below the flat coil 10. In this stator magnet 16, a north pole 16a and a south pole 16b are formed in one piece with being separated by a boundary 16c as shown in FIG. 2 so that the side edges 10a and 10b of the flat coil 10 may almost cover moving areas respectively.

Nevertheless, although the south pole 16b is formed with extending to a moving area of the outer edge 10c of the flat coil 10, the north pole 16a does not include the moving area of the outer edge 10c. In this area, an additional slim south pole 16d is located adjacently to the north pole 16a. In addition, although the upper stator magnet is similarly configured, a north pole is formed with facing the south pole in the lower side and a south pole is formed with facing the north pole in the lower side.

In the configuration described above, if current in the direction shown by an arrow m is made to pass through the flat coil 10, the side edges 10a and 10b of the flat coil 10 each receive a force in the direction shown by an arrow E showing the rotary direction since the flat coil 10 is located so that an electromagnetic action may occur between the flat coil 10 and stator magnet 16. Therefore, the actuator arm 8 obtains a rotary force in a clockwise direction. On the contrary, if current in the direction shown by an arrow n is made to pass through the flat coil 10, the side edges 10a and 10b of the flat coil each receive a force in the direction shown by an arrow F showing the rotary direction. Therefore, the actuator arm 8 obtains a rotary force in a counterclockwise direction. The outer edge 10c also receives a force in the direction shown by an arrow C or showing each radial direction according to the current passing through the outer edge 10c.

Figure 3:
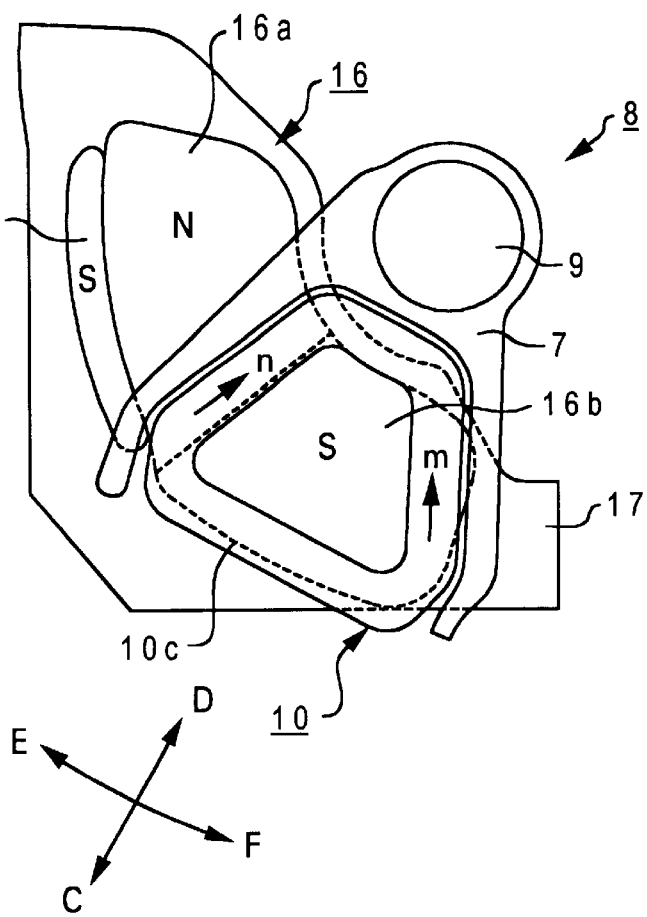
FIG. 3 is a drawing for explaining the operation of the present invention.
Figure 4:
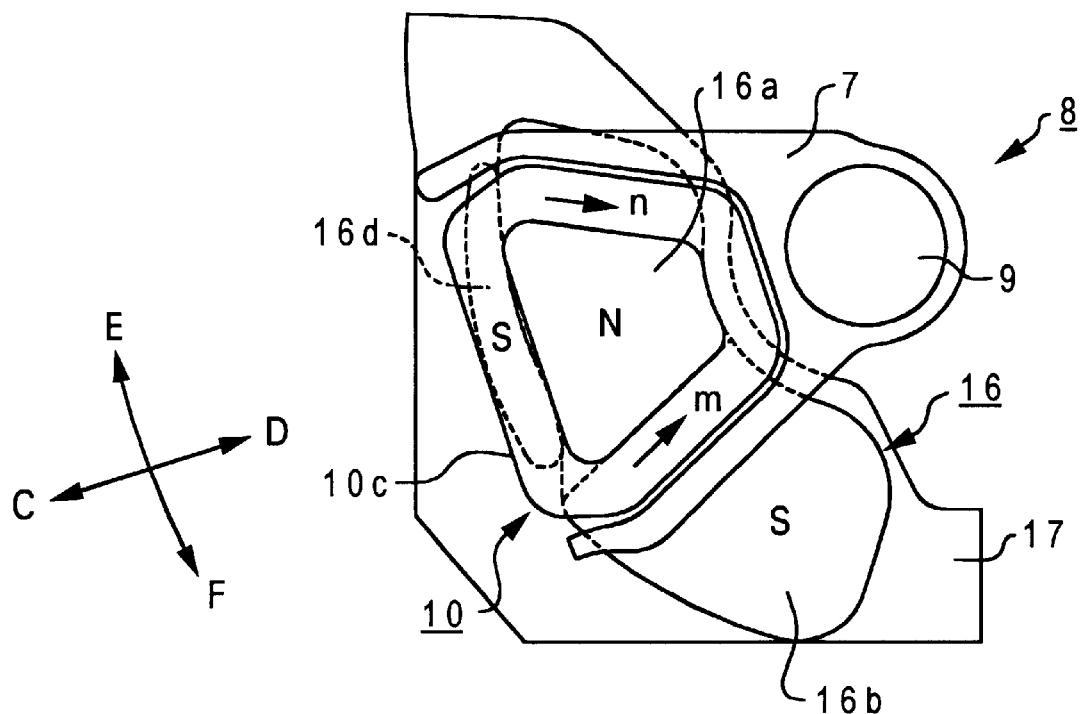
FIG. 4 is another drawing for explaining the operation of the present invention.

FIGS. 3 and 4 are operational drawings for explaining the forces that the outer edge 10c of the flat coil 10 receives. Nevertheless, similarly to FIG. 2, the suspension 6 of the actuator arm 8 is omitted, and only the stator magnet 16 that is supported by the lower stator magnet retention plate 17 provided on the base 3 is shown.

FIG. 3 shows such a state that the actuator arm 8 is present at the ID position where the actuator arm 8 rotates at most in the direction shown by an arrow F within its rotation angle. This position is a rotary position at the time when the slider 13 shown in FIG. 1 flies at a most inner position of the disk 2. Since the outer edge 10c of the flat coil 10 is present above the south pole 16b of the stator magnet 16 at this position, the outer edge 10c receives a force in the direction shown by an arrow D if the current in the direction shown by an arrow m passes through flat coil 10. On the contrary, if current in the direction shown by an arrow n passes, the flat coil 10 receives a force in the direction shown by an arrow C.

On the other hand, FIG. 4 shows such a state that the actuator arm 8 is present at the OD position where the actuator arm 8 rotates at most in the direction shown by an arrow E within its rotation angle. This position corresponds to the home position of the actuator arm 8 described above. Since the outer edge 10c of the flat coil 10 is present above the additional south pole 16d of the stator magnet 16 at this OD position, the outer edge 10c receives a force in the same direction as that at the time when the actuator arm 8 is present at the ID position, which is shown in FIG. 3. If the outer edge 10c of the flat coil 10 alternately receives forces in the directions shown by arrows C and D owing to the action described above, the coil-breathing phenomenon that is described in FIGS. 13 and 14 showing the analysis by the simulation arises.

Figure 13:
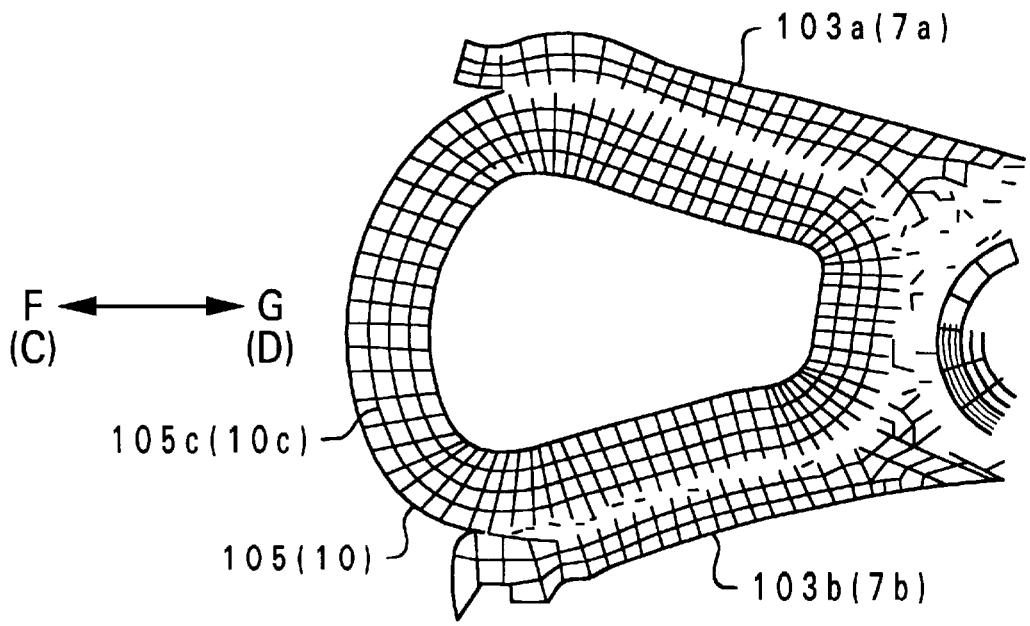
FIG. 13 is a drawing showing a transformed state of the prior art coil in a resonant state.
Figure 14:
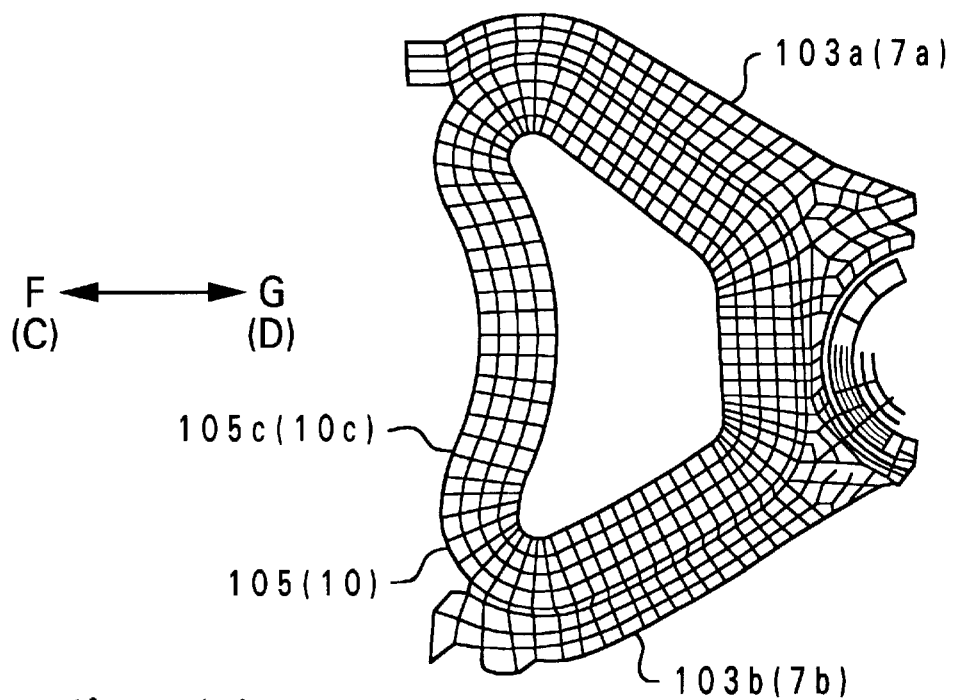
FIG. 14 is a drawing showing another transformed state of the prior art coil in a resonant state.
Figure 15A:
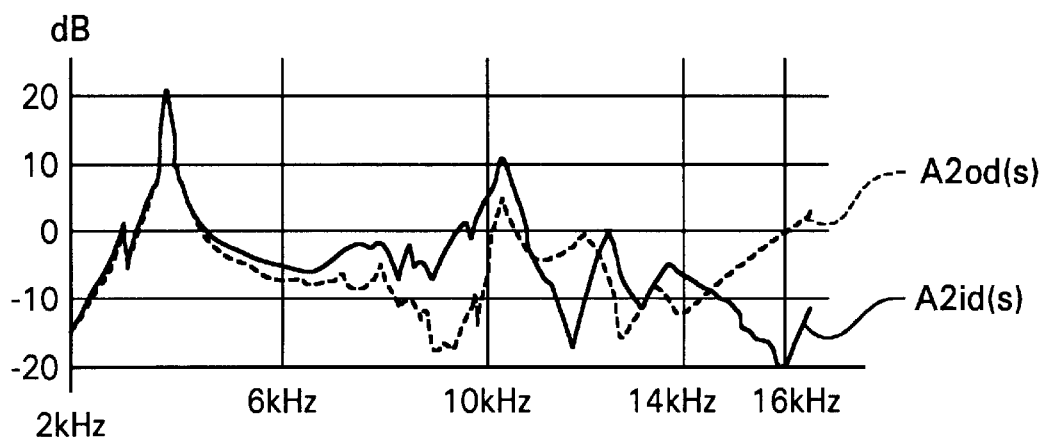
FIGS. 15(a) and 15(b) are frequency characteristic charts of a transfer function of the conventional actuator.
Figure 15B:
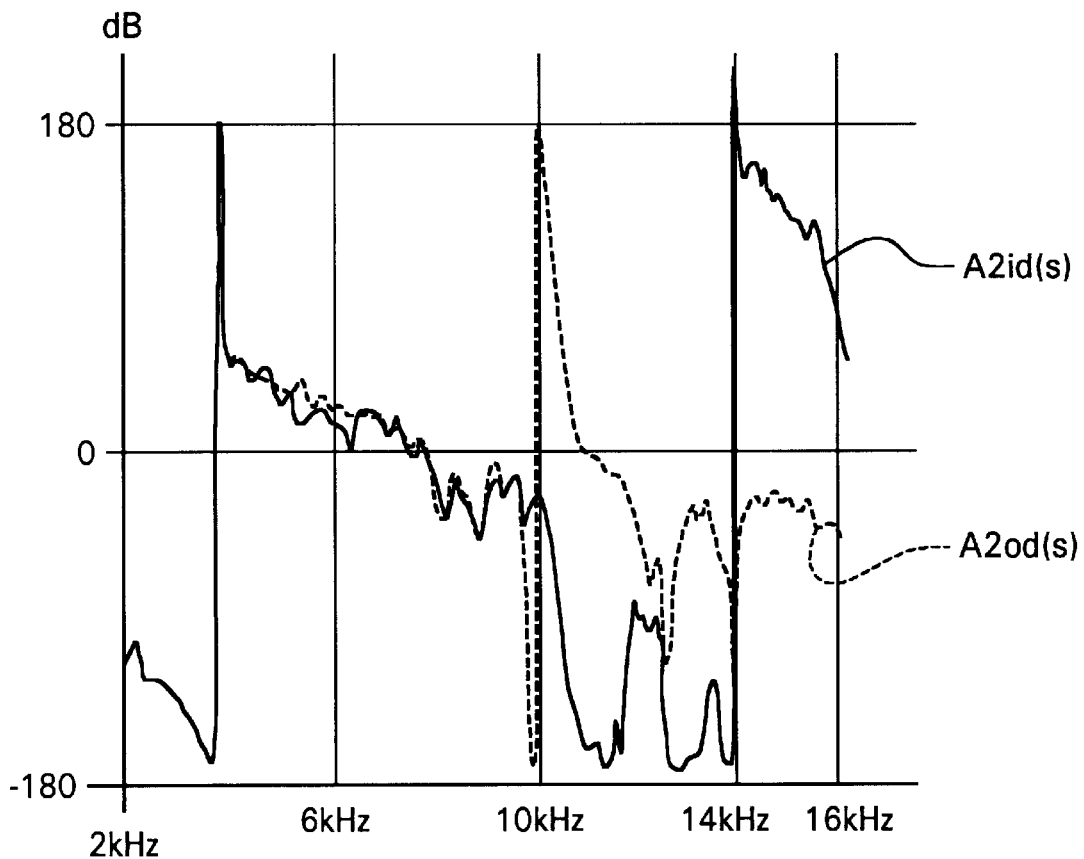

Thus, as shown in FIG. 13, when the outer edge 10c of the flat coil 10 protrudes in the direction shown by an arrow C and hence the flat coil 10 is extended, an angle between the coil supports 7a and 7b sandwiching the flat coil 10 decreases. On the contrary, when the outer edge 10c of the flat coil 10 dents in the direction shown by an arrow D and hence the flat coil 10 is shrunk, an angle between the coil supports 7a and 7b sandwiching the flat coil 10 increases.

The piezoelectric element 18 (FIG. 1) detects extension when the angle between the coil supports 7a and 7b decrease, and outputs, for example, plus voltage at a level according to the extension amount. On the contrary, the piezoelectric element 18 detects shrinkage when the angle between the coil supports 7a and 7b increases, and outputs, for example, minus voltage at a level according to the shrinkage amount. In addition, a fixed position of the piezoelectric element 18 is determined so that it is possible to detect warpage occurred when the actuator arm 8 receives acceleration in the rotary direction.

Figure 5A:
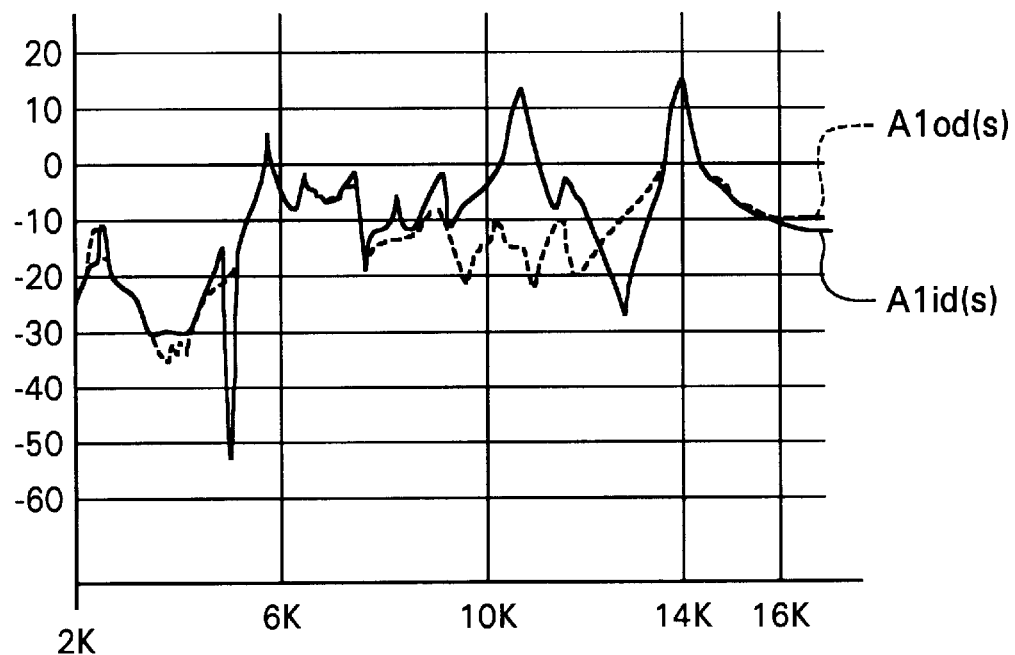
FIGS. 5(a) and 5(b) are frequency characteristic charts of a transfer function of the actuator.
Figure 5B:
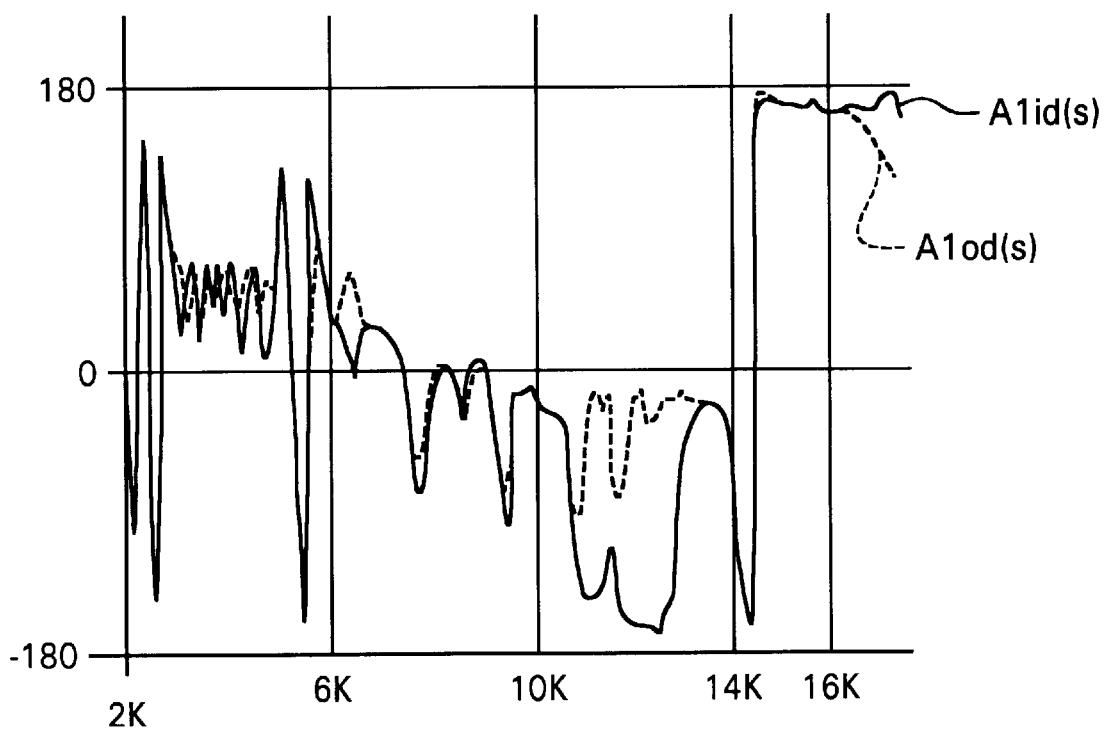

FIGS. 5a and 5b show frequency characteristics of a transfer function from the drive current of the flat coil 10 to the output voltage of the piezoelectric element 18 in the actuator 12 (FIG. 1) configured as described above. In the frequency characteristic charts, the horizontal axis shows frequencies from 2 kHz to 16 kHz that are linearly graduated. In addition, the vertical axis in FIG. 5(a) shows gains expressed in decibels, and the vertical axis in FIG. 5(b) shows phases. Furthermore, dotted lines show frequency characteristics of a transfer function A1od(s) at the time when the actuator arm 8 is near the OD position shown in FIG. 4. Moreover, continuous lines show frequency characteristics of a transfer function A1id(s) at the time when the actuator arm 8 is near the ID position shown in FIG. 3.

As being apparent from FIGS. 5a and 5b, although the actuator 12 resonates at nearly 6 kHz, this is butterfly resonance caused by the warpage of the actuator arm 8. In addition, although the phase largely changes near this frequency, two phases at different rotary positions of the actuator arm 8, that is, the OD position and ID position become the same.

On the other hand, resonance at nearly 11 kHz is coil-breathing resonance caused by the coil breathing described above. In this resonance, the phases at different rotary positions of the actuator arm 8, that is, the OD position and ID position become the same by the actuator 12 of the present invention. As described above, this is because the actuator 10 is configured so that the polarities of the stator magnets that the outer edge 10c of the flat coil 10 faces may be the same at the OD position and ID position (a south pole in the lower stator magnet 16).

As described above, according to the present invention, it is possible to always keep a phase characteristic of the actuator 12 so as to be in the same phase regardless of a rotary position of an actuator arm. Therefore, it is possible to perform stable damping control of the butterfly phenomenon and further breathing phenomenon.

Figure 6:
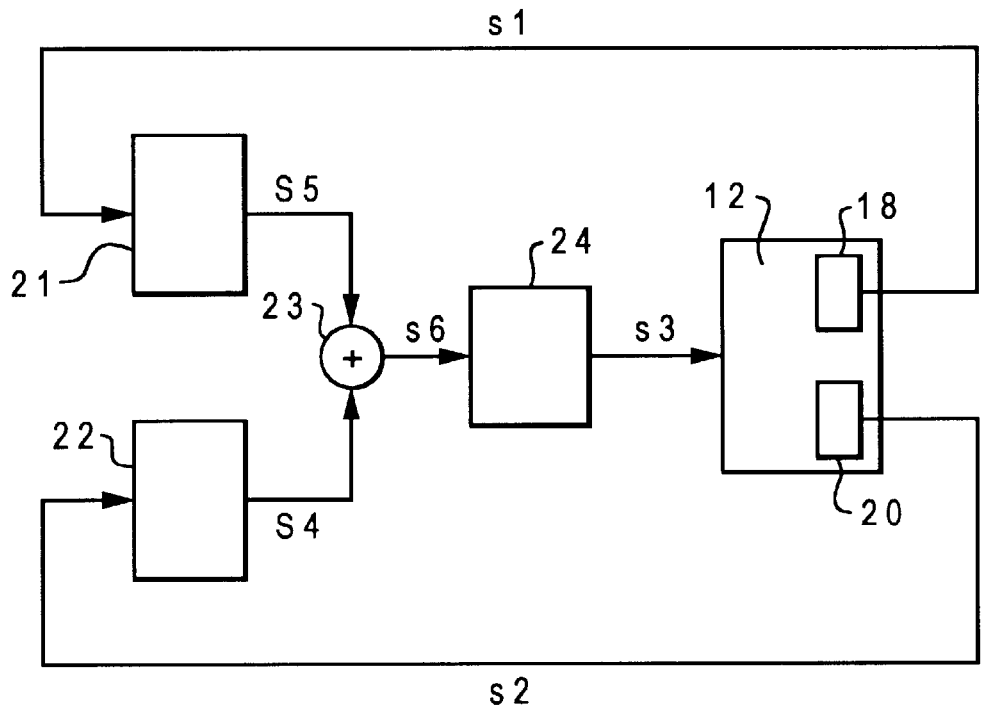
FIG. 6 is a schematic showing an example of a to control system controlling the actuator.

FIG. 6 is a schematic showing an example of a control system controlling the actuator 12, configured as described above, in a hard disk drive according to the present invention. The actuator 12 outputs a regenerative signal s2 from the head 20, and an extensional signal s1 outputted according to the extension and shrinkage of the piezoelectric element 18 described above. The tracking controller 22 takes out tracking error information from the regenerative signal s2, and outputs to an adder 23 an actuating signal s4 for performing the tracking control on the basis of this error information.

The damping controller 21 receives the extensional signal si from the piezoelectric element 18, and outputs to the adder 23 an actuating signal s5 for controlling the actuator 12 in the direction where the extension and shrinkage is damped. The adder 23 adds the actuating signal s4 to the actuating signal s5 to generate an added signal s6. A driver 24 outputs drive current s3, passing through the flat coil 10, to the actuator 12 so as to drive the VCM of the actuator 12 on the basis of this added signal s6. Owing to the control system of the actuator 12 that is configured as described above, the actuator 12 operates so as to damp the butterfly phenomenon and breathing phenomenon of the actuator 12, described above, as well as the usual tracking control.

Figure 7:
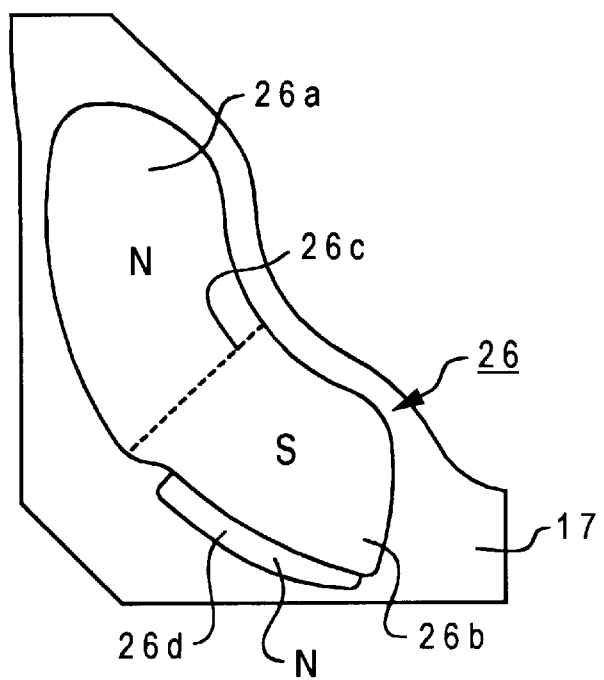
FIG. 7 is a schematic showing another example of a stator magnet of the present invention.

FIG. 7 is a schematic showing another example of a stator magnet of the present invention. The stator magnet 26 in this example is used instead of the stator magnet 16 shown in FIG. 2. In this stator magnet 26, a north pole 26a is formed with extending to a moving area of the outer edge 10c of the flat coil 10 (FIG. 2). Nevertheless, a south pole 26b does not include the moving area of the outer edge 10c, but an additional north pole 26d is located in this area adjacently to the south pole 26b.

Figure 8:
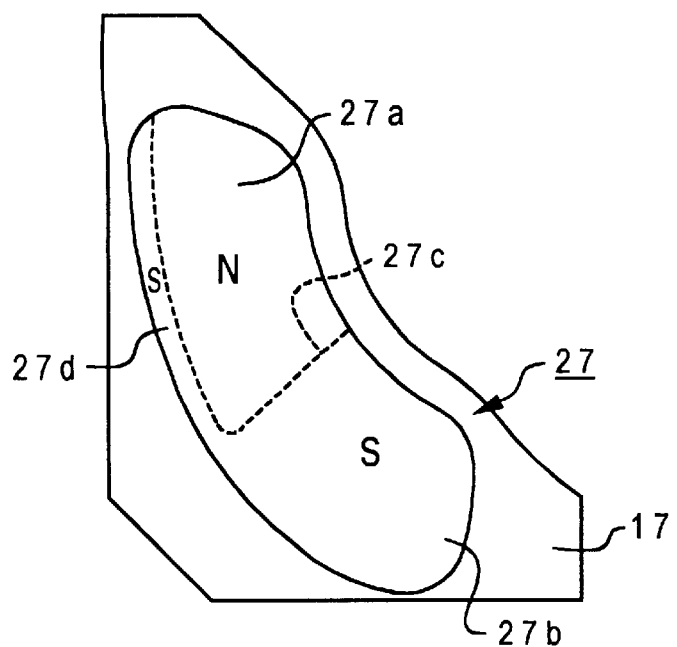
FIG. 8 is a schematic showing still another example of a stator magnet of the present invention.

FIG. 8 is a schematic showing still another example of a stator magnet of the present invention. The stator magnet 27 in this example is used instead of the stator magnet 16 shown in FIG. 2. This stator magnet 27 is formed in one piece, and is magnetized into a north pole 27a and a south pole 27b with being separated by a boundary 27c, as shown in FIG. 8. The additional slim south pole portion 27d of the south pole 27b is a portion corresponding to the moving area of the outer edge 10c of the flat coil 10 (FIG. 2).

Figure 9:
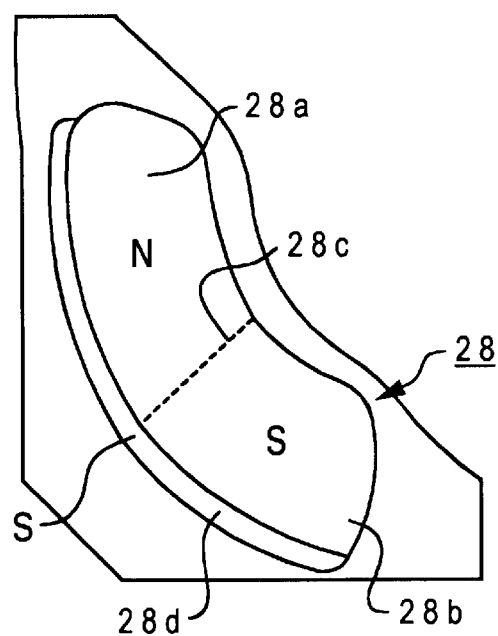
FIG. 9 is a schematic showing a further example of a stator magnet of the present invention.
Figure 10:
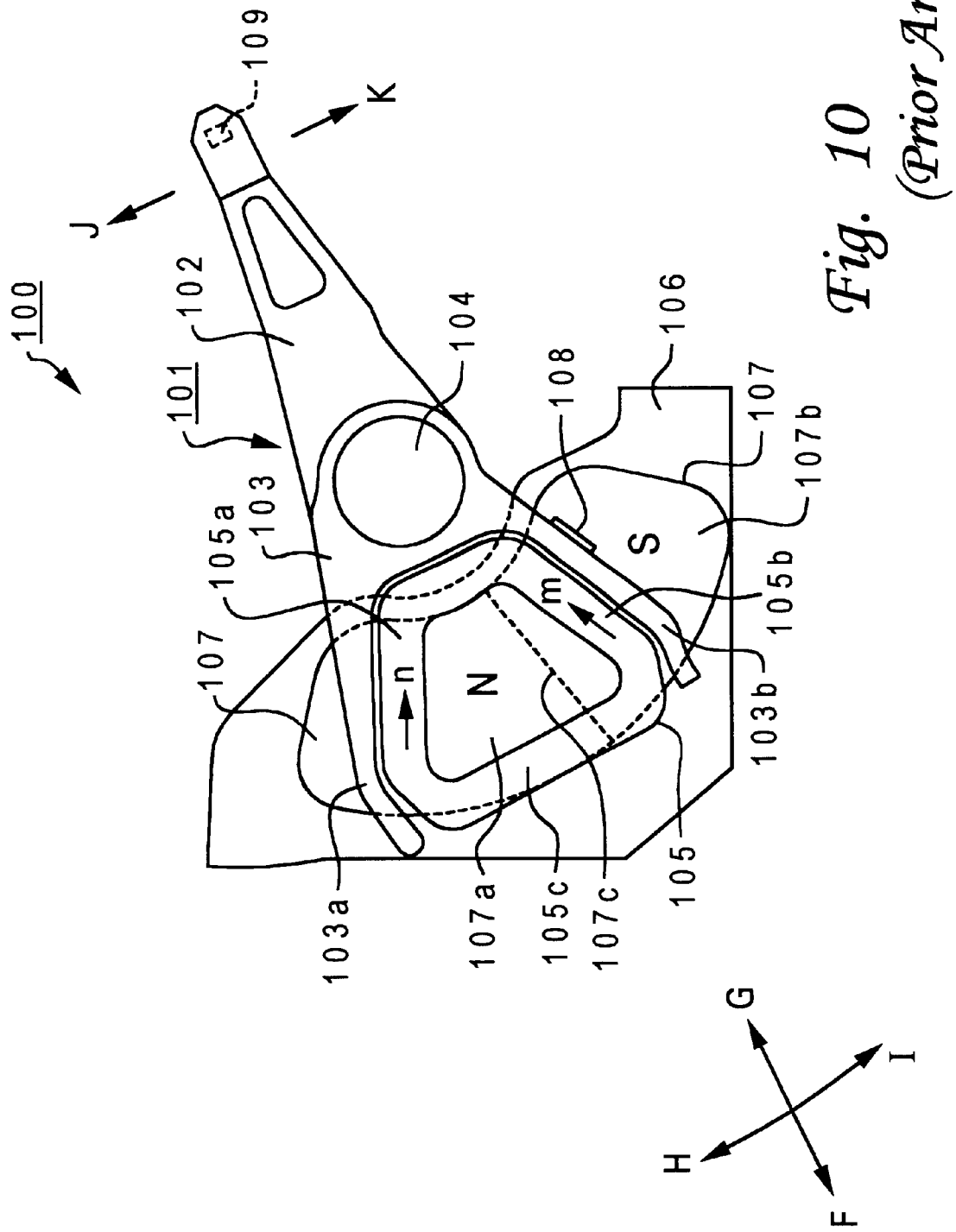
FIG. 10 is a schematic showing the configuration of an actuator used in a conventional hard disk drive.
Figure 11:
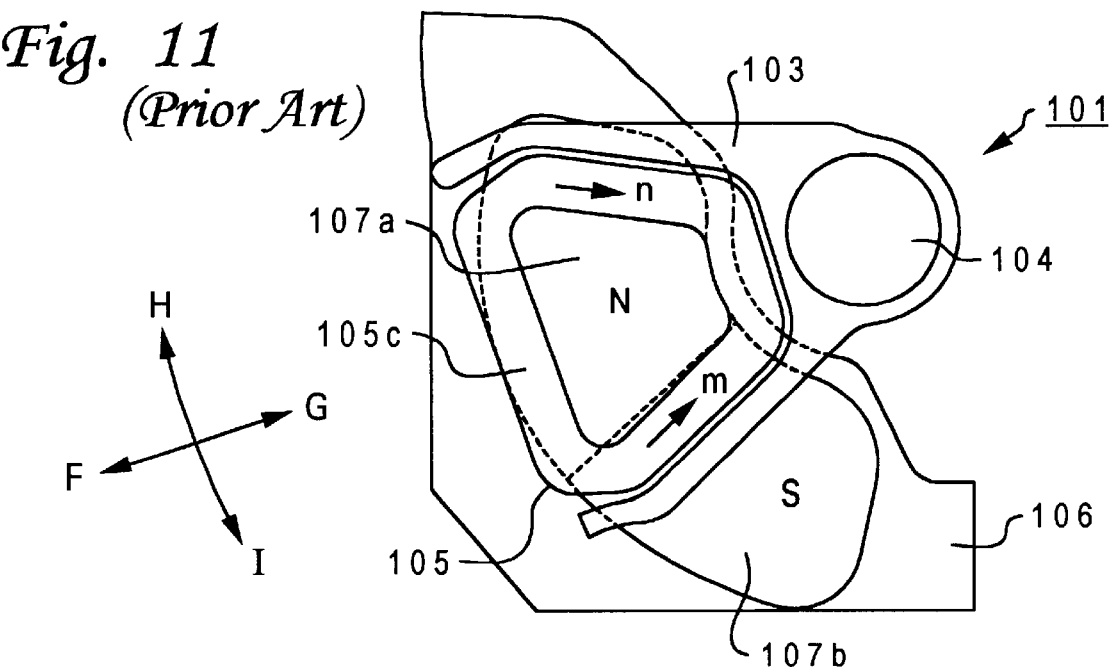
FIG. 11 is a drawing for explaining a force that a prior art flat coil 105 receives.
Figure 12:
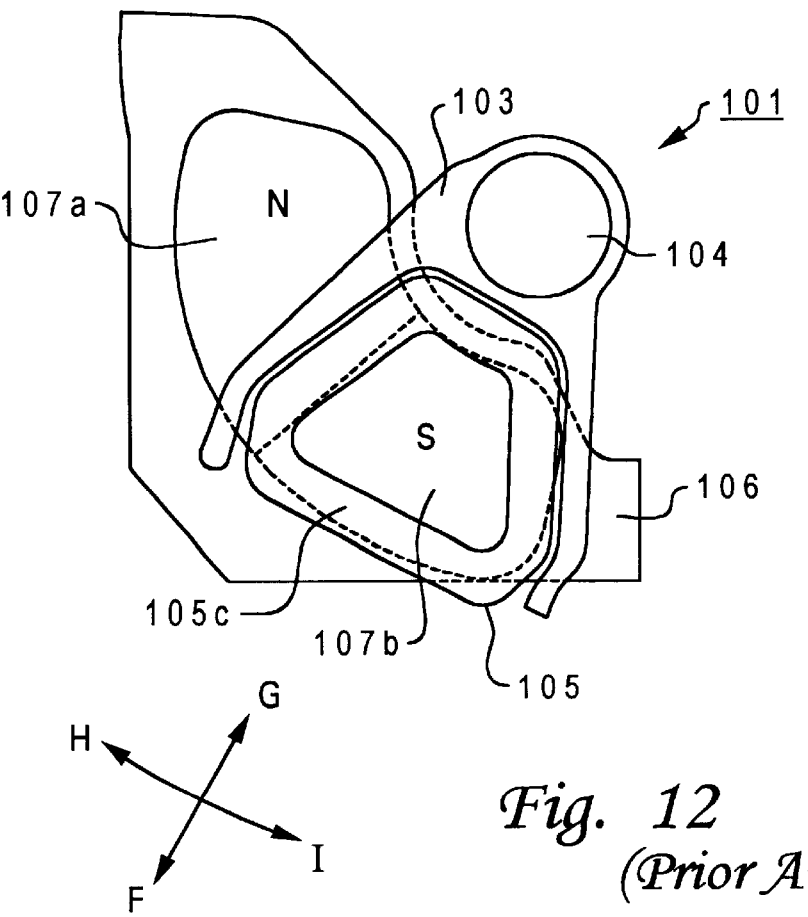
FIG. 12 is a drawing for explaining another force that prior art flat coil 105 receives.

FIG. 9 is a schematic showing a further example of a stator magnet of the present invention. The stator magnet 28 in this example is used instead of the stator magnet 16 shown in FIG. 2. A main pole portion of this stator magnet 28 is formed in one piece, and is magnetized into a north pole 27a and a south pole 27b with being separated by a boundary 28c. The additional south pole portion 28d separated from the main pole portion is adjacent to the main pole portion, and is located in a part corresponding to a moving area of the outer edge 10c of the flat coil 10. Although a piezoelectric element is used as a sensing element detecting the deformation of the actuator arm 8 in the above-described embodiment, another element acting similarly can be used instead of it.

According to the present invention, it is possible to keep a phase characteristic of a transfer function of an actuator, and in particular, a phase characteristic around a coil breathing resonance frequency so as to be in the same phase regardless of the rotary position of the actuator arm. Therefore, it is possible to always perform stable control regardless the rotary position of the actuator arm when a butterfly phenomenon and further coil-breathing phenomenon of the actuator are actively damped.

In addition, according to the present invention, by considering the configuration of a stator magnet, an object is attained, and hence it is possible to avoid cost increase in connection with implementation of the present invention, and complexity of the configuration.

What is claimed is:

1. A stator magnet forming a voice coil motor with a closed coil, the closed coil being supported by an actuator arm in a rotatable manner at a predetermined rotation angle, has first and second side edges that extend substantially along different lines in radial directions whose center is a center of rotation of the actuator arm, and has an outer edge that connects edges of outer sides of the first and second side edges when viewed in the radial direction and extending substantially along an arc whose center is the center of rotation, the stator comprising:

a first magnetic pole region located within a moving area of the first side edge to act on the first side edge;

a second magnetic pole region located within a moving area of the second side edge to act on the second side edge, wherein polarity of the second magnetic pole region is opposite to polarity of the first magnetic pole region; and a third magnetic pole region located within a moving area of the outer edge to act on the outer edge, wherein polarity of the third magnetic pole region is the same as the polarity of the first magnetic pole region.

2. The stator magnet according to claim 1, wherein a part adjacent to the first magnetic pole region in the third magnetic pole region, and the first magnetic pole region are formed in one piece.

3. The stator magnet according to claim 1, wherein the first, second, and third magnetic pole regions are formed in one piece.

4. A stator magnet according to claim 1, wherein the third magnetic pole region among the first, second, and third magnetic pole regions is formed separately.

5. An actuator, comprising:

an actuator arm rotatably supported at a predetermined rotation angle;

a closed coil supported by the actuator arm, including first and second side edges that extend substantially along different lines in radial directions whose center is a center of rotation of the actuator arm, and an outer edge that connects edges of outer sides of the first and second side edges when viewed in a radial direction and extending substantially along an arc whose center is the center of rotation;

a stator magnet having a first magnetic pole region located within a moving area of the first side edge to act on the first side edge, a second magnetic pole region located within a moving area of the second side edge to act on the second side edge, whereon a polarity of the second magnetic pole region is opposite to a polarity of the first magnetic pole region, and a third magnetic pole region located within a moving area of the outer edge to act on the outer edge, wherein a polarity of the third magnetic pole region is the same as the polarity of the first magnetic pole region; and wherein the actuator is configured so that the same polarity of magnetic pole may act on the outer edge within the predetermined rotation angle of the actuator arm.

6. The actuator according to claim 5, wherein a sensing element detecting deformation of the actuator arm is fixed on the actuator arm.

7. A hard disk drive, comprising:

an actuator having an actuator arm rotatably supported at a predetermined rotation angle;

a closed coil supported by the actuator arm, including first and second side edges that extend substantially along different lines in radial directions whose center is a center of rotation of the actuator arm, and an outer edge that connects edges of outer sides of the first and second side edges when viewed in a radial direction and extending substantially along an arc whose center is the center of rotation;

a stator magnet having a first magnetic pole region located within a moving area of the first side edge to act on the first side edge, a second magnetic pole region located within a moving area of the second side edge to act on the second side edge, wherein a polarity of the second magnetic pole region is opposite to a polarity of is the first magnetic pole region, and a third magnetic pole region located within a moving area of the outer edge to act on the outer edge, wherein a polarity of the third magnetic pole region is the same as the polarity of the first magnetic pole region; wherein the actuator is configured so that the same polarity of magnetic pole may act on the outer edge within the predetermined rotation angle of the actuator arm; and a controller controlling current passing through the coil so as to damp deformation of the actuator arm on the basis of a detection signal from a sensing element.

* * * * *